(12) United States Patent
Park

(10) Patent No.: US 9,677,970 B2
(45) Date of Patent: Jun. 13, 2017

(54) APPARATUS FOR TESTING SIDE COLLISIONS WITH A VEHICLE BODY

(71) Applicant: HYUNDAI MOTOR COMPANY, Seoul (KR)

(72) Inventor: Un Chin Park, Seoul (KR)

(73) Assignee: HYUNDAI MOTOR COMPANY, Seoul (KR)

(*) Notice: Subject to any disclaimer, the term of this patent is extended or adjusted under 35 U.S.C. 154(b) by 168 days.

(21) Appl. No.: 14/835,245

(22) Filed: Aug. 25, 2015

(65) Prior Publication Data

US 2016/0153867 A1    Jun. 2, 2016

(30) Foreign Application Priority Data

Dec. 2, 2014 (KR) .......................... 10-2014-0170797

(51) Int. Cl.
| | | |
|---|---|---|
| *G01M 7/08* | (2006.01) | |
| *G01M 17/00* | (2006.01) | |
| *G01M 17/007* | (2006.01) | |

(52) U.S. Cl.
CPC .......... *G01M 17/0078* (2013.01); *G01M 7/08* (2013.01)

(58) Field of Classification Search
CPC ... G01M 17/007; G01M 7/08; G01M 17/0078
See application file for complete search history.

(56) References Cited

U.S. PATENT DOCUMENTS

| | | | | | |
|---|---|---|---|---|---|
| 2,303,804 | A | * | 12/1942 | Waid ...................... | B60C 27/10 |
| | | | | | 152/241 |
| 4,183,511 | A | * | 1/1980 | Marek ...................... | B66F 3/08 |
| | | | | | 254/100 |
| 5,009,406 | A | * | 4/1991 | McDermott .......... | B62D 65/06 |
| | | | | | 269/17 |
| 5,652,375 | A | | 7/1997 | Da Re' | |
| 5,936,167 | A | * | 8/1999 | Kulig .................. | G01M 99/008 |
| | | | | | 73/865.6 |

(Continued)

FOREIGN PATENT DOCUMENTS

| | | | | |
|---|---|---|---|---|
| ES | 2303804 | A1 * | 8/2008 | ........ G01M 17/0078 |
| JP | 2005-85138 | A | 3/2005 | |
| KR | 0117967 | Y1 | 5/1998 | |

(Continued)

OTHER PUBLICATIONS

Park Un-chin et al, "The trolley test way of IIHS small overlap and side test—with minimized structure usage-", 24th ESV Conference, Sweden Gothenburg, Jun. 8, 2015.

*Primary Examiner* — Matthew G Marini
*Assistant Examiner* — Ruben Parco, Jr.
(74) *Attorney, Agent, or Firm* — McDermott Will & Emery LLP

(57) ABSTRACT

An apparatus for testing a side collision with a vehicle body connects between a side carriage for testing a side collision and a side structure which includes a roof rail part configured to be connected to an upper portion of the side carriage, a side sill part configured to be connected to a side lower part of the side carriage, and a pillar part configured to connect between the roof rail part and the side sill part and be connected to a pillar of the side carriage. The side carriage is connected to the side structure while forming a space between the side carriage and the side structure.

10 Claims, 16 Drawing Sheets

(56) References Cited

U.S. PATENT DOCUMENTS 6,113,090 A * 9/2000 Hui .................. B60J 5/0468
　　　　　　　　　　　　　　　　　　269/296
6,178,805 B1    1/2001 Kosaraju et al.

FOREIGN PATENT DOCUMENTS

| KR | 10-0206240 B1   | 7/1999  |
|----|-----------------|---------|
| KR | 10-2005-0117094 A | 12/2005 |
| KR | 10-2005-0121552 A | 12/2005 |
| KR | 10-2008-0026817 A | 3/2008  |
| KR | 10-2011-0096299 A | 8/2011  |

* cited by examiner

APPARATUS FOR TESTING SIDE COLLISIONS WITH A VEHICLE BODY

CROSS-REFERENCE TO RELATED APPLICATION

This application is based on and claims the benefit of priority to Korean Patent Application No. 10-2014-0170797, filed on Dec. 2, 2014 in the Korean Intellectual Property Office, the disclosure of which is incorporated herein in its entirety by reference.

TECHNICAL FIELD

The present disclosure relates to an apparatus for testing a side collision with a vehicle body, and more particularly, to an apparatus for testing a side collision with a vehicle body capable of performing an assessment in a side structure assembly unit.

BACKGROUND

Generally, to assess a vehicle body, a test is performed by various methods such as a fracture test, a carriage test, an impact test, etc., to assess safety of the vehicle body. In particular, in testing a side collision, a test for a vehicle body portion can be made by performing the fracture test on a door pillar part using a drop tower, etc., the carriage test on a door part of the vehicle body, or an SLED vehicle body assessment. Further, a test for a sharp edge of a door trim part at the time of the side collision can be made by performing a door trim impact test, a door trim carriage test, and a door trim SLED assessment.

FIG. 1 is a diagram illustrating a fracture test using a drop tower among assessments associated with a vehicle body. The fracture test using the drop tower performs a fracture test on a 'B' pillar part 1000 of the vehicle body using a drop tower 2000. FIG. 2 is a diagram illustrating a door trim impact test as a test for a sharp edge of a door trim part. As illustrated in FIG. 2, the door trim impact test applies a local impact to a door trim part 3000 using an impact apparatus 4000 to assess the occurrence of the shaft edge.

However, in the test for the side collision, a real vehicle test is repeatedly performed for empirical analysis and prediction. This not only causes a problem in that test cost is excessive, but also causes a problem in that as a test is not performed in a side vehicle body assembly unit but a test is performed on an individual part, an integrated assessment pursuant to accuracy of a test and a real vehicle assessment is not performed.

SUMMARY

The present disclosure is made to solve the above-mentioned problems occurring in the prior art while advantages achieved by the prior art are maintained intact.

An aspect of the present disclosure provides an apparatus for testing a side collision with a vehicle body, capable of performing an assessment in a side structure assembly unit.

According to an exemplary embodiment of the present disclosure, an apparatus for testing a side collision with a vehicle body connects between a side carriage for testing the side collision and a side structure which includes a roof rail part configured to be connected to an upper portion of the side carriage, a side sill part configured to be connected to a side lower part of the side carriage, and a pillar part configured to connect between the roof rail part and the side sill part and be connected to a pillar of the side carriage, wherein the side carriage is connected to the side structure while forming a space between the side carriage and the side structure.

In connecting between the side lower part and the side sill part, a contact portion with the side sill part may be provided with an 'L'-shaped bracket to form a space at the time of connecting between the side sill part and the side lower part.

The 'L'-shaped bracket may be connected to three places of the side sill part and may be provided as a first 'L'-shaped bracket, a second 'L'-shaped bracket, and a third 'L'-shaped bracket.

The apparatus may further include: a middle 'V' member configured to include a first middle member having one side connected to a first side lower part and the other side connected to the second 'L'-shaped bracket and a second middle member having one side connected to a third side lower part and the other side connected to the second 'L'-shaped bracket; a front 'V' member configured to include a first front member having one side connected to the first side lower part and the other side connected to the first 'L'-shaped bracket and a second front member having one side connected to the first middle member and the other side connected to the first 'L'-shaped bracket; and a rear member configured to have one side connected to the second middle member and the other side connected to the third 'L'-shaped bracket, wherein the side lower part includes the first side lower part configured to be adjacent to a first wheel part of the side carriage, the third side lower part configured to be adjacent to a second wheel part of the side carriage, and the second side lower part configured to connect between the first lower part and the third lower part.

The apparatus may further include: a rail configured to connect among the first side lower part, the third side lower part, the first middle member, and the second middle member, to reinforce stiffness.

In connecting between the upper portion of the side carriage and the roof rail part, a contact portion with the roof rail part may be provided with a gap step member to connect between the roof rail part and the upper portion of the side carriage while forming a space at the time of connecting between the roof rail part and the upper portion of the side carriage.

The gap step member may be provided in a trapezoidal shape.

The apparatus may further include: a front 'x' member configured to have one end connected to a side upper front part; a rear 'x' member configured to have one end connected to a side upper rear part; and a bending rail configured to be extendedly formed so that one end thereof is connected to the other end of the front 'x' member and the other end thereof is connected to the other end of the rear 'x' member and have one side connected to the gap step member, wherein the upper portion of the side carriage is provided with a side upper front part adjacent to the first side lower part and the side upper rear part adjacent to the third side lower part.

The front 'x' member may be formed in a quadrangular section and may be provided in a structure in which two front 'x' members are layered to overlap each other.

The upper portion of the side carriage may be further provided with a rear roof rail which is connected to a roof rail of the roof rail part.

The rear side member may include: a first rear 'x' member configured to connect between the bending rail and a middle portion of the side upper rear part of the side carriage; a second rear 'x' member configured to connect between the bending rail and an end of the side upper rear part; and a third rear 'x' member configured to connect between the rear roof rail and the bending rail.

The apparatus may further include: in connecting between an 'A' pillar part and an 'A' pillar, a first 'A' pillar connection member configured to connect between an upper portion of the 'A' pillar part and an upper portion of the 'A' pillar; a second 'A' pillar connection member configured to connect between a middle portion of the 'A' pillar part and a middle portion of the 'A' pillar; a third 'A' pillar connection member configured to connect between a lower portion of the 'A' pillar and a front portion of the side sill part, wherein the pillar of the side carriage includes the 'A' pillar at a position corresponding to the 'A' pillar part of the side structure, a 'B' pillar at a position corresponding to a 'B' pillar part of the side structure, and a 'C' pillar at a position corresponding to a 'C' pillar part of the side structure.

The 'C' pillar part may include: a 'Y' bracket configured to connect between the 'C' pillar of the side structure and the 'C' pillar part; a second 'C' pillar member configured to be connected to the 'C' pillar of the side structure and a body adjacent to a wheel of the side carriage; a first 'C' pillar member configured to connect between the rear roof rail and the second 'C' pillar member; a third 'C' pillar member configured to connect between a rear portion of the side sill part of the side structure and a lower portion of the 'C' pillar part of the side carriage; and a fourth 'C' pillar member configured to connect between the rear portion of the side sill part of the side structure and the lower portion of the 'C' pillar part of the side carriage, together with the third 'C' pillar member.

The apparatus may further include: a sheet replacement member configured to be positioned over the middle 'V' member and provided in a 'U'-letter shape which is opened upwardly.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
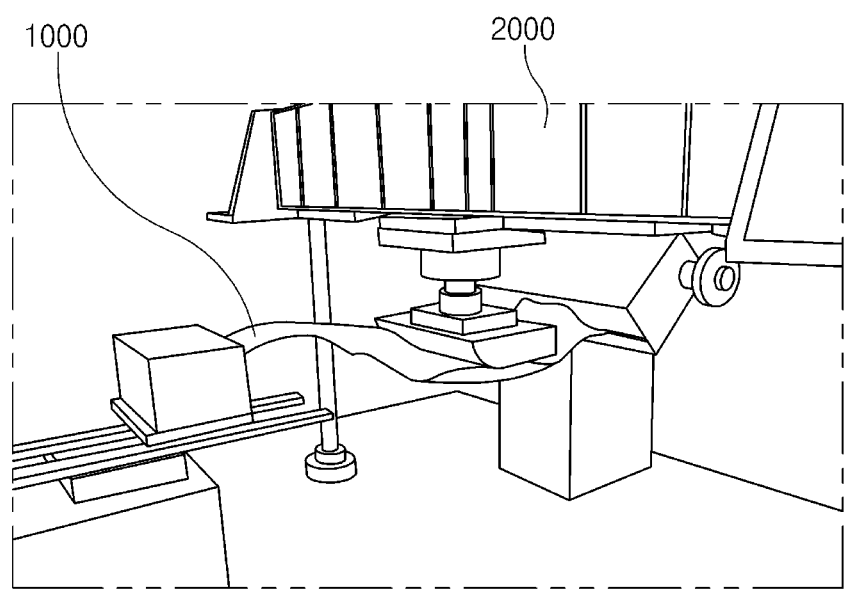
FIG. 1 is a diagram illustrating a fracture test of a vehicle body using a known drop tower.
Figure 2:
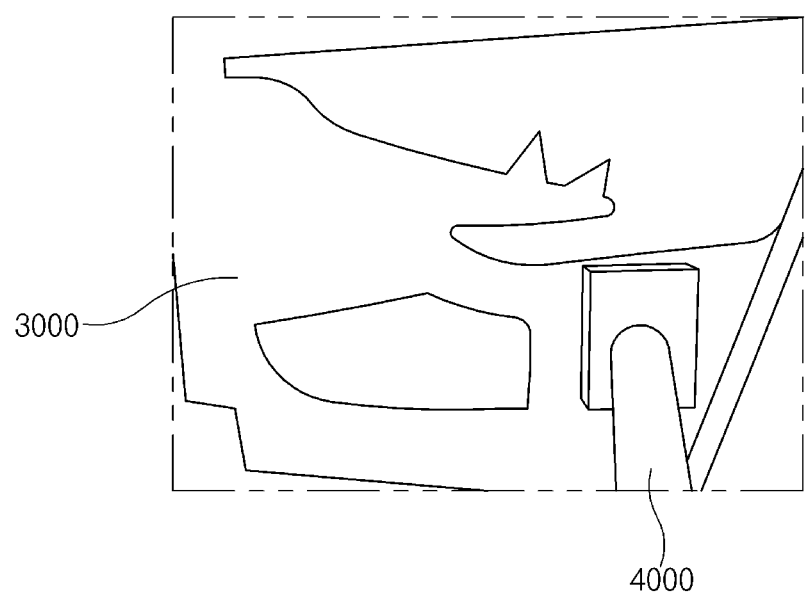
FIG. 2 is a diagram illustrating a sharp edge test of a door trim part of a vehicle.
Figure 3:
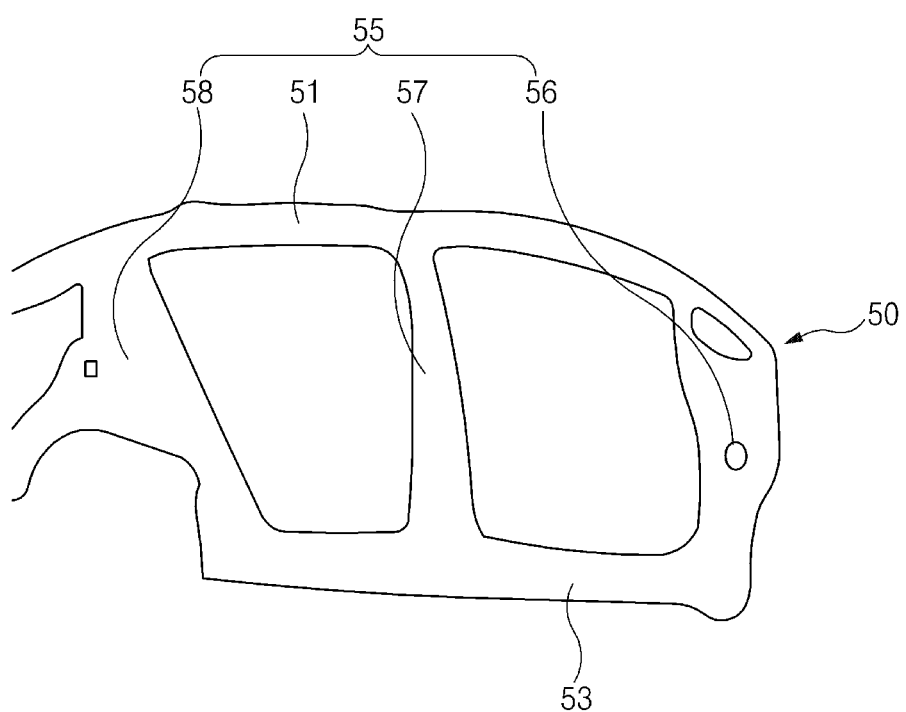
FIG. 3 is a diagram illustrating a side structure of a vehicle body.

Hereinafter, exemplary embodiments of the present disclosure will be described in detail with reference to the accompanying drawings. As illustrated in FIGS. 3 to 16, an apparatus for testing a side collision with a vehicle body according to an exemplary embodiment of the present invention connects between a side carriage 10 for testing a side collision and a side structure 50. The side structure 50 includes a roof rail part 51 configured to be connected to an upper portion of the side carriage 10, a side sill part 53 configured to be connected to a side lower part of the side carriage 10, and a pillar part 56, 57, 58 configured to connect between the roof rail part 51 and the side sill part 53 (shown in FIG. 3). The pillar part 56, 57, and 58 is also connected to a pillar of the side carriage 10 (not shown in FIG. 3). The side carriage 10 is connected to the side structure 50 while forming a space between the side carriage 10 and the side structure 50.

Figure 4:
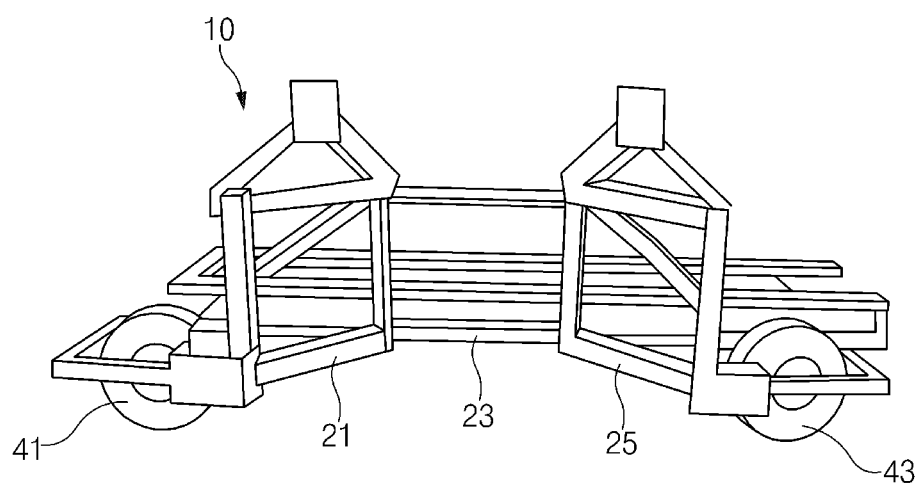
FIG. 4 is a diagram illustrating a side carriage of a vehicle body.

FIG. 4 is a diagram illustrating a side carriage. The side carriage 10 may control a length, a width, a weight, a height, and the like of a vehicle to correspond to a length and weight range of all the vehicle models and is a general-purpose side carriage 10.

Figure 5:
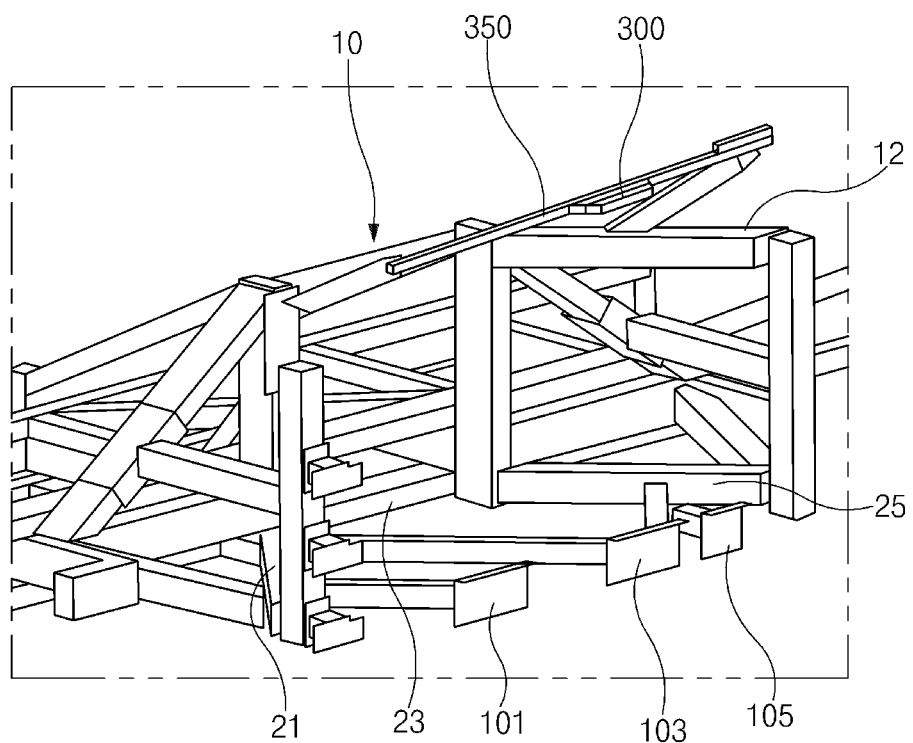
FIG. 5 is a diagram illustrating a side carriage of a vehicle body, according to an exemplary embodiment of the present invention.
Figure 6:
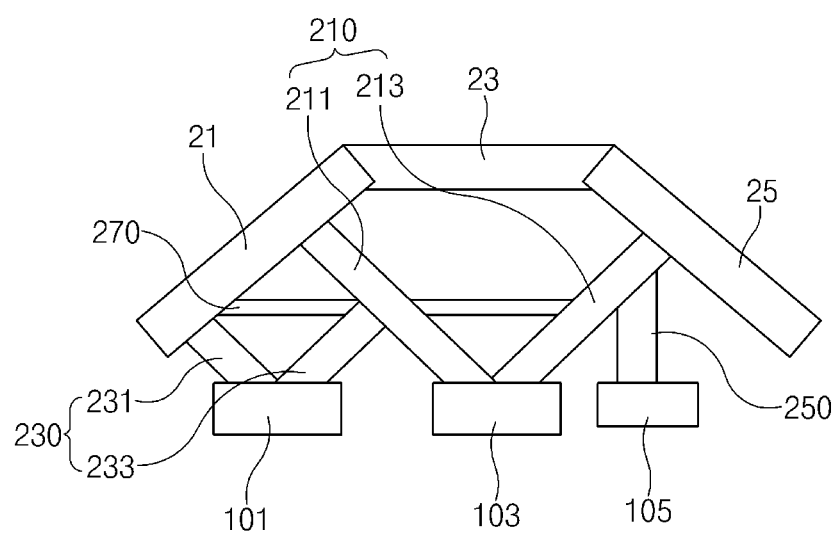
FIG. 6 is a diagram illustrating a 'V-V-I'-shaped member of a vehicle body, according to an exemplary embodiment of the present invention.
Figure 7:
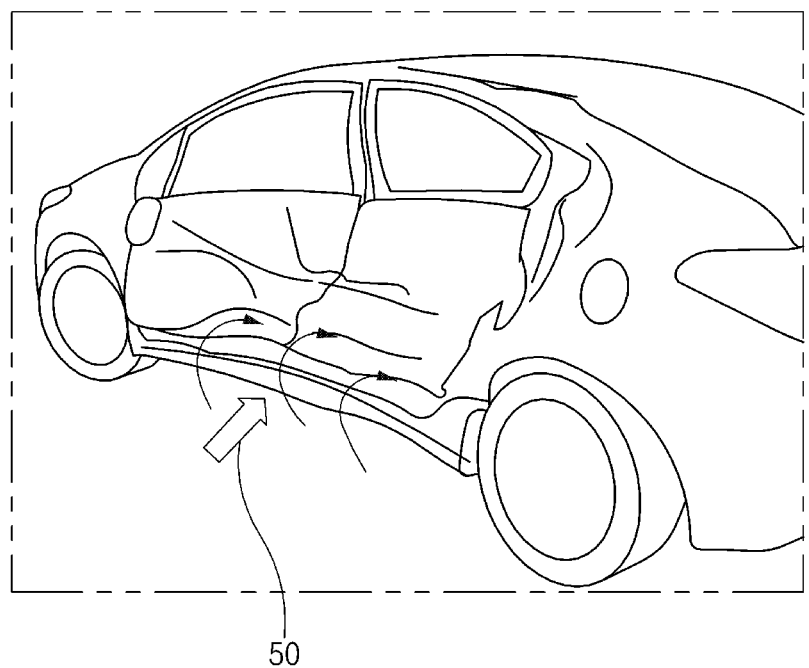
FIG. 7 is a diagram illustrating a deformation and a rotation of a side sill part of a vehicle body at the time of testing the side structure.

FIGS. 5 to 7 are diagrams illustrating connection between the side lower part of the side carriage 10 and the side sill part 53 of the side structure 50. As illustrated in FIGS. 5 to 7, to connect between the side lower part of the side carriage 10 and the side sill part 53 of the side structure 50 while forming the space, the side lower part of the side carriage 10 and the side sill part 53 of the side structure 50 are connected to each other by an 'L'-shaped bracket and a "V-V-I"-shaped member.

The 'L'-shaped bracket is provided as a first 'L'-shaped bracket 101, a second 'L'-shaped bracket 103, and a third 'L'-shaped bracket 105 and is thus connected to three places of the side sill part 53. The 'L'-shaped bracket is provided as an 'L'-letter shape and may be connected to the side sill part 53 while forming a space at the time of the connection with the side sill part 53.

For describing the connection between the 'L'-shaped bracket and the 'V-V-I'-shaped member, the side lower part of the side carriage 10 will be first described. As illustrated in FIGS. 4 and 5, the side lower part of the side carriage 10 includes a first side lower part 21 configured to be adjacent to a first wheel part 41 of the side carriage 10, a third side lower part 25 configured to be adjacent to a second wheel part 43 which is positioned at the other side of the first wheel part 41 of the side carriage 10, and a second side lower part 23 configured to connect between the first side lower part 21 and the third side lower part 25.

The 'V-V-I' member includes a front 'V' member 230 provided in a 'V'-letter shape, a middle 'V' member 210 provided in the 'V'-letter shape, and a rear member 250 provided in an 'I'-letter shape.

The middle 'V' member 210 includes a first middle member 211 configured to have one side connected to the first side lower part 21 and the other side connected to the second 'L'-shaped bracket 103 and a second middle member 213 configured to have one side connected to the third side lower part 25 and the other side connected to the second 'L'-shaped bracket 103. That is, ends of one side of the first middle member 211 and one side of the second middle member 213 are each connected to the side carriage 10 and ends of the other side of the first middle member 211 and the other side of the second middle member 213 are connected to the second 'L'-shaped bracket 103, and thus the first middle member 211 and the second middle member 213 are formed in the 'V'-letter shape. The first middle member 211 forms an angle of −45° and is connected to the side lower part of the side carriage 10 and the first 'L'-shaped bracket 101. Therefore, a delivery load to the front door side of the side structure 50 is dispersed to the first side lower part 21 of the side carriage 10. Further, the second middle member 213 forms an angle of +45° and is connected to the third side lower part 25 of the side carriage and the second 'L'-shaped bracket 103. Therefore, the delivery load to the front door side of the side structure 50 is dispersed to the third side lower part 25.

The front 'V' member 230 includes a first front member 231 configured to have one side connected to the first side lower part 21 and the other side connected to the first 'L'-shaped bracket 101 and a second front member 233 configured to have one side connected to the first middle member 211 and the other side connected to the first 'L'-shaped bracket 101. That is, ends of one side of the first front member and one side of the second front member are each connected to the side carriage 10 and the middle 'V' member 210 and ends of the other side of the first front member and the other side of the second front member are connected to the first 'L'-shaped bracket 101, and thus the first front member and the second front member are formed in the 'V'-letter shape. The first front member 231 forms an angle of −45° and is connected to the side lower part of the side carriage 10 and the first 'L'-shaped bracket 101. Therefore, a delivery load to the side sill part 53 at the front door side of the side structure 50 is dispersed to the first side lower part 21 of the side carriage 10. Further, the second front member 233 forms an angle of +45° and is connected to the middle 'V' member 210 and the first 'L'-shaped bracket 101. Therefore, the delivery load to the side sill part 53 at the front door side of the side structure 50 is dispersed to the middle 'V' member 210.

The rear member 250 has one side connected to the second middle member 213 and the other side connected to the third 'L'-shaped bracket 105. Therefore, the delivery load to the side sill part 53 (shown in FIG. 8) at a rear door side of the side structure 50 is dispersed to the second middle member 213.

Meanwhile, to reinforce stiffness, the apparatus for testing a side collision with body of a vehicle may further include a rail 270 configured to connect among the first side lower part 21, the third side lower part 25, the first middle member 211, and the second middle member 213. The rail 270 forms an angle of 90° and connects among the first side lower part 21 and the third side lower part 25 of the side carriage 10, the first middle member 211, and the second middle member 213. Therefore, the entire stiffness is reinforced at the time of an assembly.

As described above, as the side lower part of the side carriage 10 and the side sill part 53 of the side structure 50 are connected to each other by the 'L'-shaped bracket and the 'V-V-I' member, the side lower part of the side carriage 10 and the side sill part 53 of the side structure 50 are connected to each other while forming a space due to the 'L'-shaped bracket, such that a deformation level and a rotation control of the side sill part 53 of the vehicle may be reproduced. Further, the side sill part 53 may be semi-permanently used. Further, as the side lower part of the side carriage 10 and the side sill part 53 of the side structure 50 are connected to each other by the 'V-V-I' member, the side lower part of the side carriage 10 and the side sill part 53 of the side structure 50 may be connected to each other at an angle of 45°. Therefore, the member may be formed in a structure without being deformed even by a small weight as compared with a connection structure merely having an angle of 0°. Further, it is possible to individually control the deformation of other doors for each vehicle to be tested (shown in FIG. 7).

FIGS. 8 to 11 are diagrams illustrating connection between the upper portion of the side carriage 10 and the roof rail part 51 of the side structure 50. As illustrated in FIGS. 8 to 11, a contact portion with the roof rail part 51 is provided with a gap step member 300 to connect between the roof rail part 51 and the upper portion of the side carriage 10 while forming a space at the time of connecting between the roof rail part 51 and the upper portion of the side carriage 10. The gap step member 300 is provided in a trapezoidal shape and it is preferable to connect between the roof rail part 51 and the upper portion of the side carriage 10 so that a short side is positioned at a contact portion with the side structure 50 (shown in FIG. 11).

The upper portion of the side carriage 10 is provided with a side upper front part 11 adjacent to the first side lower part 21 and a side upper rear part 12 adjacent to the third side lower part 25. Therefore, a connection structure between the upper portion of the side carriage 10 and the roof rail part 51 includes a front 'x' member 310 configured to have one end connected to the side upper front part 11, a rear 'x' member 330 configured to have one end connected to the side upper rear part 12, and a bending rail 350 configured to be extendedly formed so that one end of the bending rail 350 is connected to the other end of the front 'x' member 310 and the other end thereof is connected to the other end of the rear 'x' member 330 and have one side connected to the gap step member 300.

The bending rail 350 connects between contacts of the front 'x' member 310 and the rear 'x' member 330 and thus the bending rail 350 may take full charge of the deformation to control the deformation and the rotation of the roof rail part 51 of the side structure 50. Therefore, the bending rail serves to prevent other connection members from being damaged (shown in FIG. 10).

Meanwhile, as the bending rail 350 is attached to the roof rail part 51 at a gap step by the gap step member 300, a bending portion of the bending rail 350 may be divided into two portions to prepare for a bending deformation of one portion. Therefore, the bending rail 350 may stabilize the deformation shape and prevent the roof rail part 51 of the side structure 50 and the bending rail from contacting each other (shown in FIG. 10).

The upper portion of the side carriage 10 may be further provided with a rear roof rail 13 which is connected to the roof rail of the roof rail part 51 of the side structure. Therefore, it is possible to prevent the abnormal local deformation of the roof rail which may occur when the bending rail 350 is directly connected to the roof rail.

Figure 8:
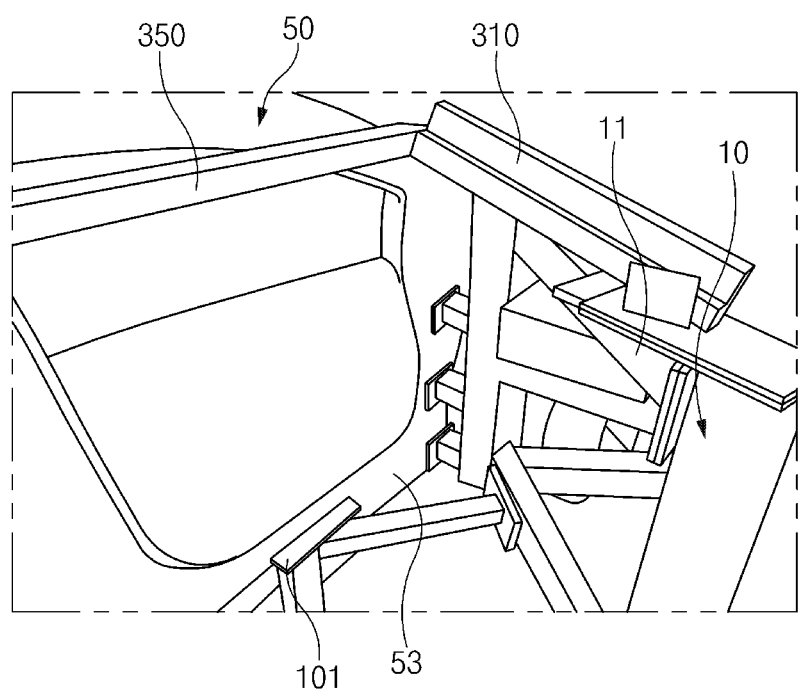
FIGS. 8 to 11 are diagrams illustrating connection between an upper portion of the side carriage and a roof rail part of the side structure of a vehicle body, according to an exemplary embodiment of the present invention.

The front 'x' member 310 connects between the side upper front part 11 of the side carriage 10 and the bending rail 350. As illustrated in FIG. 8, the front 'x' member 310 is formed in a quadrangular section and is provided in a structure in which two front 'x' members 310 are layered to overlap each other. Therefore, stiffness may be maintained so that the roof rail does not deviate from the bending rail 350 at the time of the deformation of the roof rail part 51 of the side structure 50.

Figure 9:
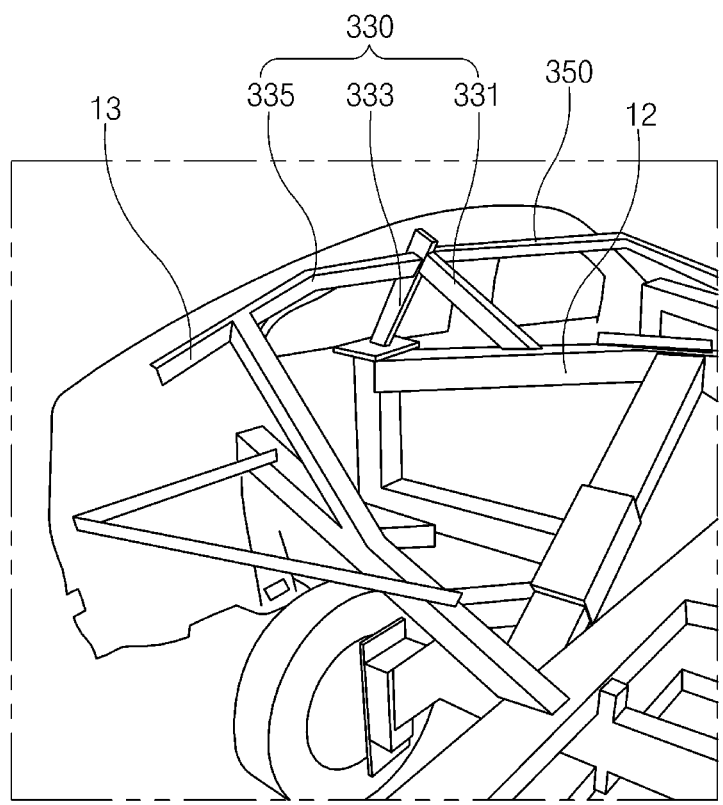
Figure 10:
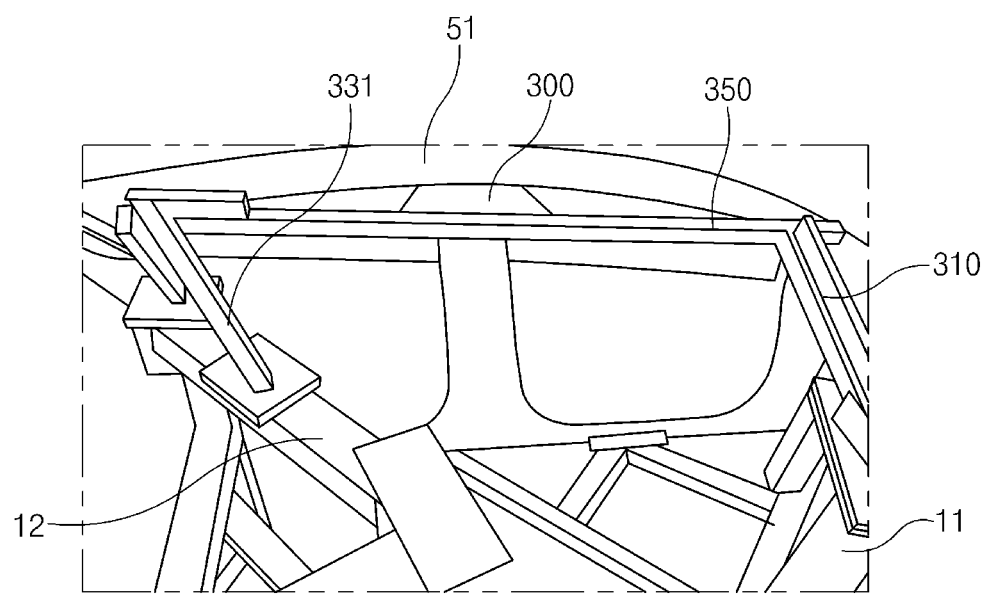
Figure 11:
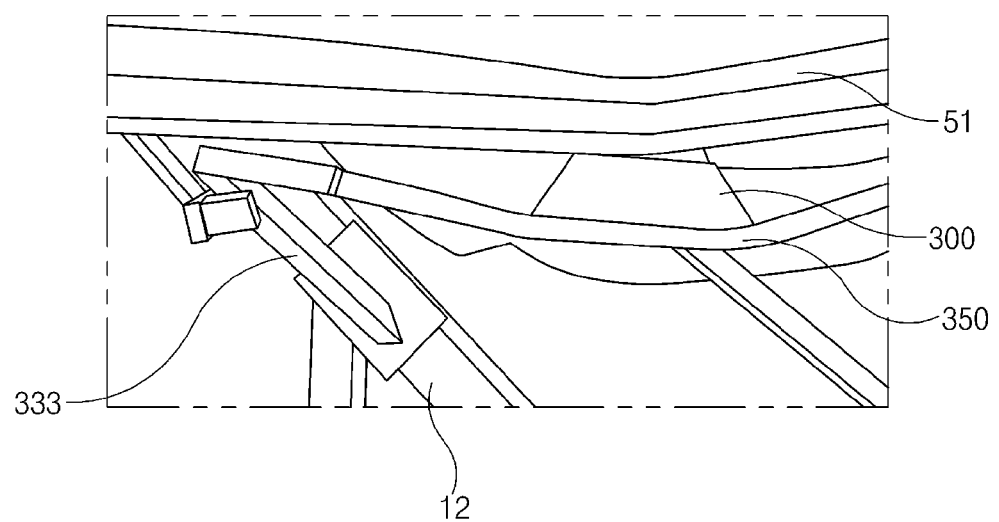

As illustrated in FIG. 9, the rear 'x' member 330 includes a first rear 'x' member 331 configured to connect between the bending rail 350 and a middle portion of the side upper rear part 12 of the side carriage 10, a second rear 'x' member 333 configured to connect between the bending rail 350 and an end of the side upper rear part 12, and a third rear 'x' member 335 configured to connect between the rear roof rail 13 and the bending rail 350. Therefore, a stable support may be made in all directions of X, Y, and Z in a 3 dimensional space. Therefore, it is possible to prevent the bending rail 350 from being pushed backward or from being separated in a vertical direction at the time of deforming the bending rail 350.

As described above, as the upper portion of the side carriage 10 is connected to the roof rail part 51 of the side structure 50, the connection structure for a test may be semi-permanently used when only the bending rail 350 is replaced. Further, it is possible to reproduce the deformation level and the rotation control of the roof rail part 51 of the real vehicle.

FIGS. 12 to 15 are diagrams illustrating connection between the pillar of the side carriage 10 and the pillar part of the side structure 50. First describing the pillar structure of the side carriage 10, the pillar of the side carriage 10 includes an 'A' pillar 31 at a position corresponding to an 'A' pillar part 56 of the side structure 50, and a 'C' pillar 33 at a position corresponding to a 'C' pillar part 58 of the side structure 50.

Figure 12:
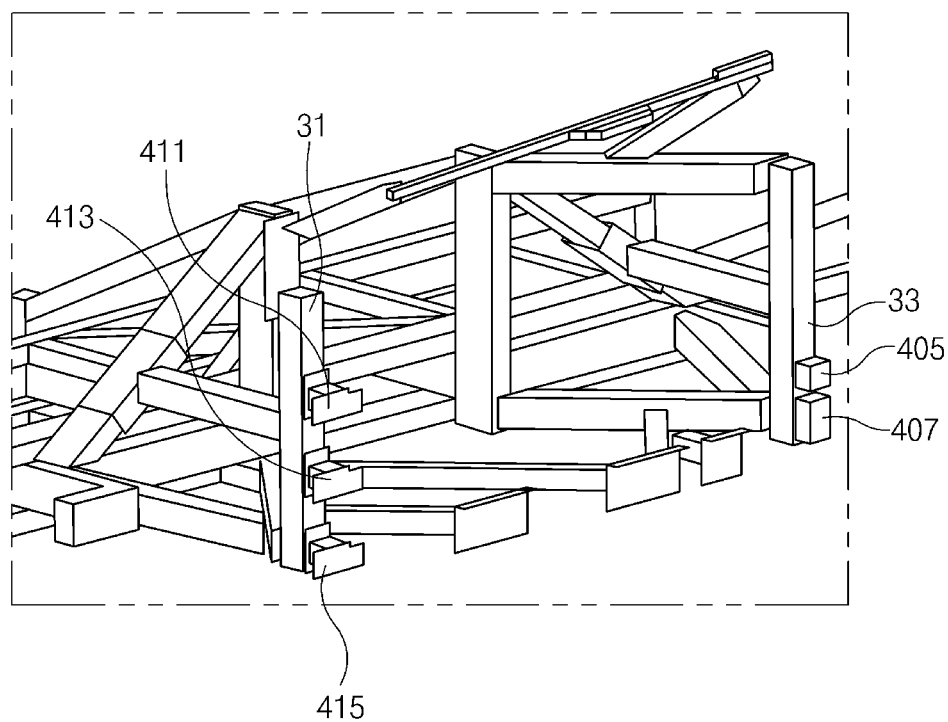
FIGS. 12 to 15 are diagrams illustrating connection between a pillar of the side carriage and a pillar part of the side structure of a vehicle body.
Figure 13:
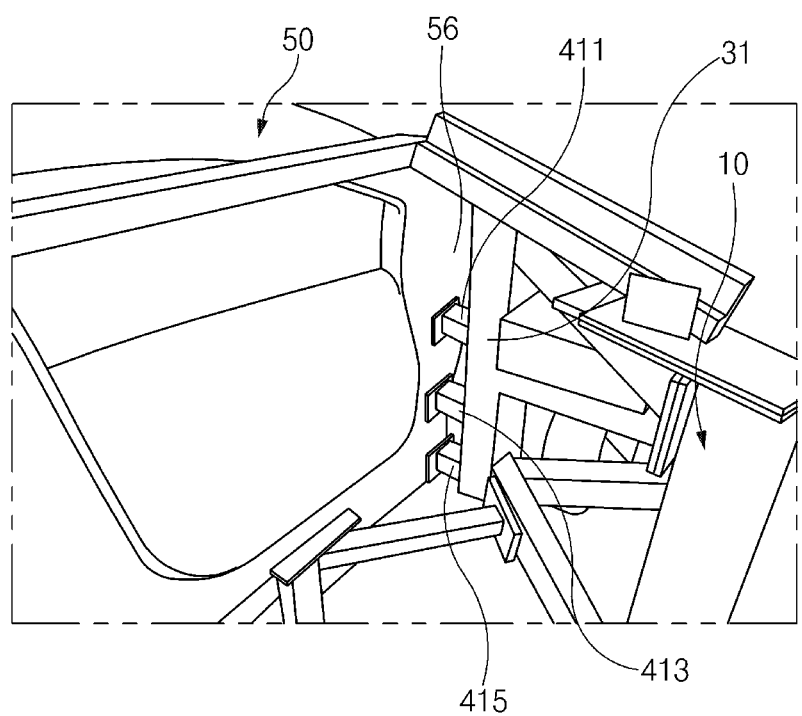

As illustrated in FIGS. 12 and 13, the 'A' pillar part 56 of the side structure 50 is connected to the 'A' pillar 31 of the side carriage 10 by a first 'A' pillar connection member 411, a second 'A' pillar connection member 413, and a third 'A' pillar connection member 415. The first 'A' pillar connection member 411 connects between an upper portion of the 'A' pillar part 56 and an upper portion of the 'A' pillar 31. The second 'A' pillar connection member 413 connects between a middle portion of the 'A' pillar part 56 and a middle portion of the 'A' pillar 31. The third 'A' pillar connection member 415 connects between a lower portion of the 'A' pillar 31 and a front portion of the side sill part 53. That is, the 'A' pillar part 56 of the side structure 50 and the 'A' pillar 31 of the side carriage 10 connect three portions of upper, middle, lower portions to one another at an angle of 0°. Therefore, a side steel which is a main load delivery path is separately supported, three portions of the 'A' pillar part 56 of the side structure 50 are supported to prevent the local deformation, and when more than three portions of the 'A' pillar part 56 are supported, a weight may be reduced.

The 'C' pillar part 58 of the side structure 50 is connected to 'C' pillar 33 of the side carriage 10 by a 'Y' bracket 400, a first 'C' pillar member 403, a second 'C' pillar member 401, a third 'C' pillar member 405, and a fourth 'C' pillar member 407.

Figure 14:
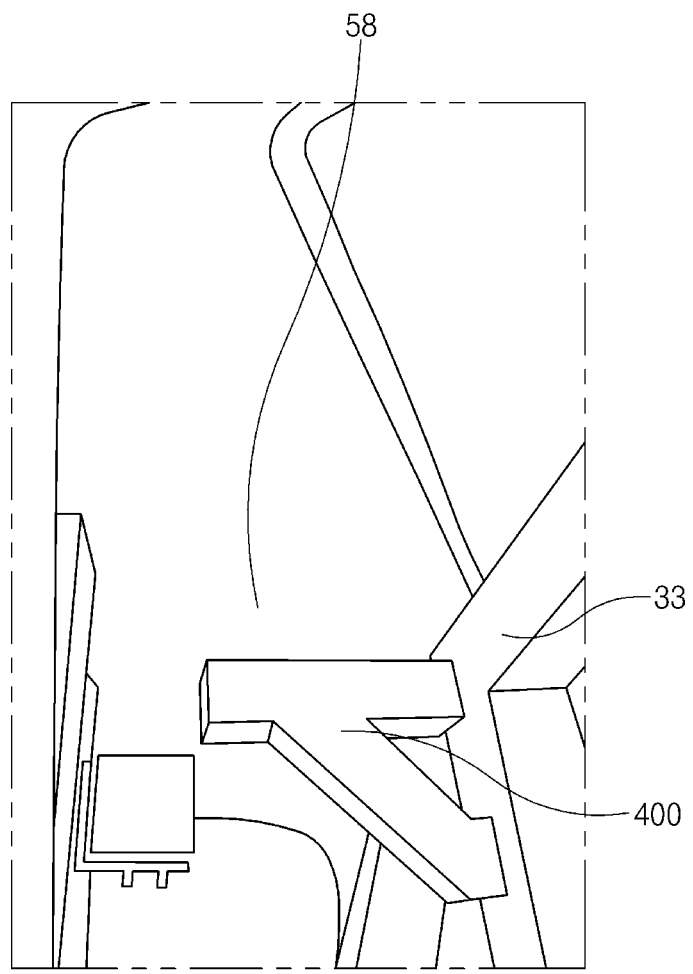

As illustrated in FIG. 14, the 'Y' bracket 400 connects between the 'C' pillar part 58 of the side structure 50 and the 'C' pillar 33 of the side carriage 10 and is provided in a 'Y'-letter shape. The 'Y' bracket 400 connects between the 'C' pillar part 58 of the side structure 50 and the 'C' pillar 33 of the side carriage 10 in an X direction as much as a position difference between the 'C' pillar part 58 of the side structure 50 and the 'C' pillar 33 of the side carriage 10 to fit a position between the 'C' pillar 33 and the 'C' pillar part 58 and supports stiffness to prevent the pushing in the X direction.

Figure 15:
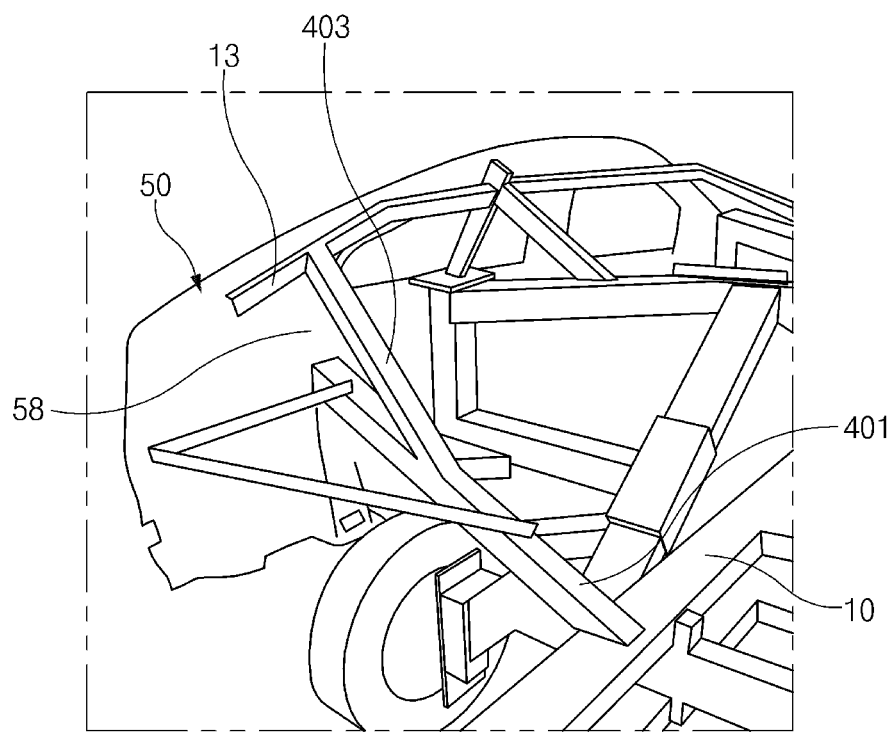

As illustrated in FIG. 15, the second 'C' pillar member 401 is connected to the 'C' pillar part 58 of the side structure 50 and a body portion adjacent to a wheel of the side carriage 10. The first 'C' pillar member 403 connects between the rear roof rail 13 and the second 'C' pillar member 401. The second 'C' pillar member 401 and the first 'C' pillar member 403 may prevent the 'C' pillar part 58 of the side structure 50 from being abnormally lifted. That is, the first 'C' pillar member 403 and the second 'C' pillar member 401 may prevent the 'C' pillar part 58 of the side structure 50 from being abnormally lifted at the time of connecting the 'C' pillar part 58 of the side structure 50 and the 'C' pillar 33 of the side carriage 10 by the connection structure of the 'C' pillar 33 of the side carriage 10.

The third 'C' pillar member 405 connects between a rear portion of the side sill part 53 of the side structure 50 and a lower portion of the 'C' pillar 33 of the side carriage 10. The fourth 'C' pillar member 407 connects between the rear portion of the side sill part 53 of the side structure 50 and the lower portion of the 'C' pillar 33 of the side carriage 10, together with the third 'C' pillar member 405. Therefore, a lower portion of the bending structure of the side sill part 53 may be fixed.

Figure 16:
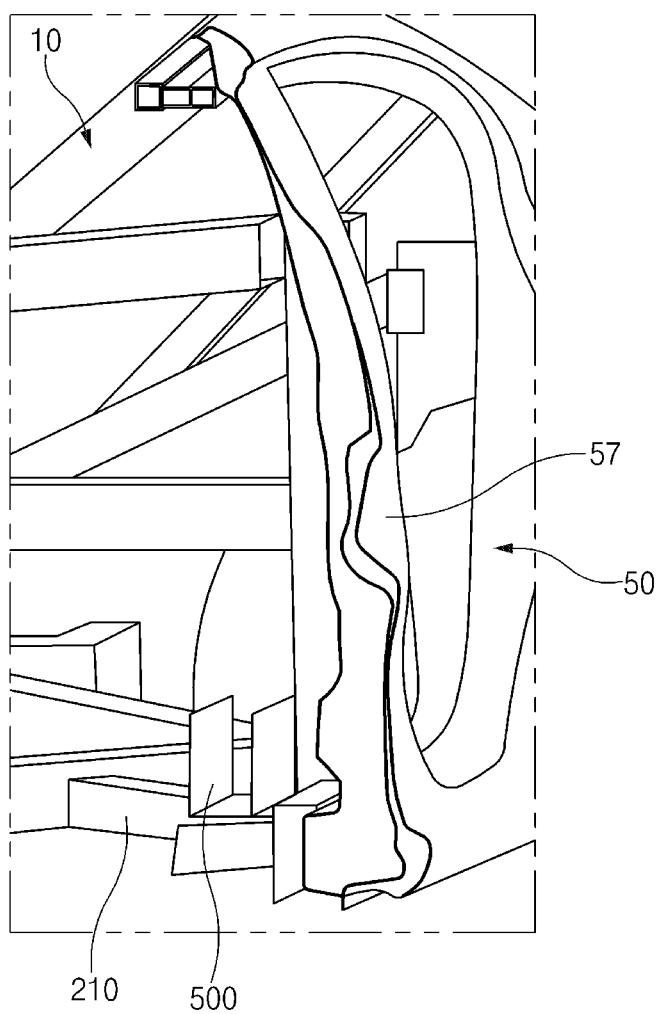
FIG. 16 is a diagram illustrating a sheet replacement member of a vehicle body, according to an exemplary embodiment of the present invention.

Meanwhile, an intrusion speed may be excellently reproduced due to the inside fracture of the 'B' pillar part 57 of the side structure 50 but to prevent a difference in static deformation from occurring, a sheet replacement member for replacing a sheet is further provided. As illustrated in FIG. 16, the sheet replacement member 500 is positioned over the middle 'V' member 210 and is provided in a 'U'-letter shape which is opened upwardly. Therefore, it is possible to prevent the fracture from occurring at the time of the static deformation of the 'B' pillar part 57 of the side structure 50 and reproduce the support of the sheet with the simple structure. Further, it is possible to control the support stiffness at two steps depending on the setting of the thickness.

As described above, according to the apparatus for testing a side collision with a vehicle body in accordance with the exemplary embodiments of the present disclosure, it is possible to improve the accuracy of the side collision test by performing the assessment in the side structure assembly unit.

It is to be understood that the above-mentioned exemplary embodiments are illustrative rather than being restrictive in all aspects, and the scope of the present disclosure will be defined by the claims rather than the above-mentioned detailed description. In addition, all modifications and alternations derived from the claims and their equivalents are to be interpreted to be included in the scope of the present disclosure.

What is claimed is:

1. An apparatus for testing a side collision with a vehicle body, comprising:
    a side carriage for testing the side collision; and
    a side structure comprising:
        a roof rail part configured to be connected to an upper portion of the side carriage,
        a side sill part configured to be connected to a side lower part of the side carriage, and
        a pillar part configured to connect between the roof rail part and the side sill part and be connected to a pillar of the side carriage,
    wherein the side carriage is connected to the side structure while forming a space between the side carriage and the side structure,
    wherein, in connecting between the side lower part and the side sill part, a contact portion with the side sill part is provided with an 'L'-shaped bracket to form a space at the time of connecting between the side sill part and the side lower part, wherein the 'L'-shaped bracket is connected to three places of the side sill part and is provided as a first 'L'-shaped bracket, a second 'L'-shaped bracket, and a third 'L'-shaped bracket, the apparatus further comprising:

a middle 'V' member configured to include:

a first middle member having one side connected to a first side lower part and the other side connected to the second 'L'-shaped bracket, and a second middle member having one side connected to a third side lower part and the other side connected to the second 'L'-shaped bracket;

a front 'V' member configured to include:

a first front member having one side connected to the first side lower part and the other side connected to the first 'L'-shaped bracket, and a second front member having one side connected to the first middle member and the other side connected to the first 'L'-shaped bracket;

a rear member configured to have one side connected to the second middle member and the other side connected to the third 'L'-shaped bracket, wherein the side lower part includes the first side lower part configured to be adjacent to a first wheel part of the side carriage, the third side lower part configured to be adjacent to a second wheel part of the side carriage, and a second side lower part configured to connect between the first side lower part and the third side lower part, wherein, in connecting between the upper portion of the side carriage and the roof rail part, a contact portion with the roof rail part is provided with a gap step member to connect between the roof rail part and the upper portion of the side carriage while forming a space at the time of connecting between the roof rail part and the upper portion of the side carriage;

a front 'x' member configured to have one end connected to a side upper front part;

a rear 'x' member configured to have one end connected to a side upper rear part; and a bending rail configured to be extendedly formed so that one end thereof is connected to the other end of the front 'x' member and the other end thereof is connected to the other end of the rear 'x' member and have one side connected to the gap step member, wherein the upper portion of the side carriage is provided with the side upper front part adjacent to the first side lower part and the side upper rear part adjacent to the third side lower part.

2. The apparatus according to claim 1, further comprising: a rail configured to connect among the first side lower part, the third side lower part, the first middle member, and the second middle member, to reinforce stiffness.

3. The apparatus according to claim 1, further comprising: a sheet replacement member configured to be positioned over the middle 'V' member and provided in a 'U'-letter shape which is opened upwardly.

4. The apparatus according to claim 1, wherein the gap step member is provided in a trapezoidal shape.

5. The apparatus according to claim 1, wherein the front 'x' member is formed in a quadrangular section and is provided in a structure in which two front 'x' members are layered to overlap each other.

6. The apparatus according to claim 1, wherein the upper portion of the side carriage is further provided with a rear roof rail which is connected to a roof rail of the roof rail part.

7. The apparatus according to claim 6, wherein the rear side member includes:

a first rear 'x' member configured to connect between the bending rail and a middle portion of the side upper rear part of the side carriage;

a second rear 'x' member configured to connect between the bending rail and an end of the side upper rear part; and a third rear 'x' member configured to connect between the rear roof rail and the bending rail.

8. The apparatus according to claim 1, wherein the pillar of the side carriage includes an 'A' pillar at a position corresponding to an 'A' pillar part of the side structure, and a 'C' pillar at a position corresponding to a 'C' pillar part of the side structure.

9. The apparatus according to claim 8, wherein the 'A' pillar part of the side structure is connected to the 'A' pillar of the side carriage by a first 'A' pillar connection member, a second 'A' pillar connection member, and a third 'A' pillar connection member, the first 'A' pillar connection member is configured to connect between an upper portion of the 'A' pillar part and an upper portion of the 'A' pillar, the second 'A' pillar connection member is configured to connect between a middle portion of the 'A' pillar part and a middle portion of the 'A' pillar, and the third 'A' pillar connection member is configured to connect between a lower portion of the 'A' pillar and a front portion of the side sill part.

10. The apparatus according to claim 8, wherein the 'C' pillar part of the side structure is connected to the 'C' pillar of the side carriage by a 'Y' bracket, a first 'C' pillar member, a second 'C' pillar member, a third 'C' pillar member, and a fourth 'C' pillar member, the 'Y' bracket is configured to connect between the 'C' pillar of the side carriage and the 'C' pillar part, the second 'C' pillar member is configured to be connected to the 'C' pillar part of the side structure and a body adjacent to a wheel of the side carriage, the first 'C' pillar member is configured to connect between a rear roof rail and the second 'C' pillar member, and the third 'C' pillar member is configured to connect between a rear portion of the side sill part of the side structure and a lower portion of the 'C' pillar of the side carriage.

* * * * *